Sept. 30, 1958   A. R. McLERRAN   2,854,252
TRAILER LIFTING APPARATUS
Filed Aug. 8, 1956   3 Sheets-Sheet 1

Archie R. McLerran
INVENTOR.

BY Browning, Simms & Hyer
ATTORNEYS

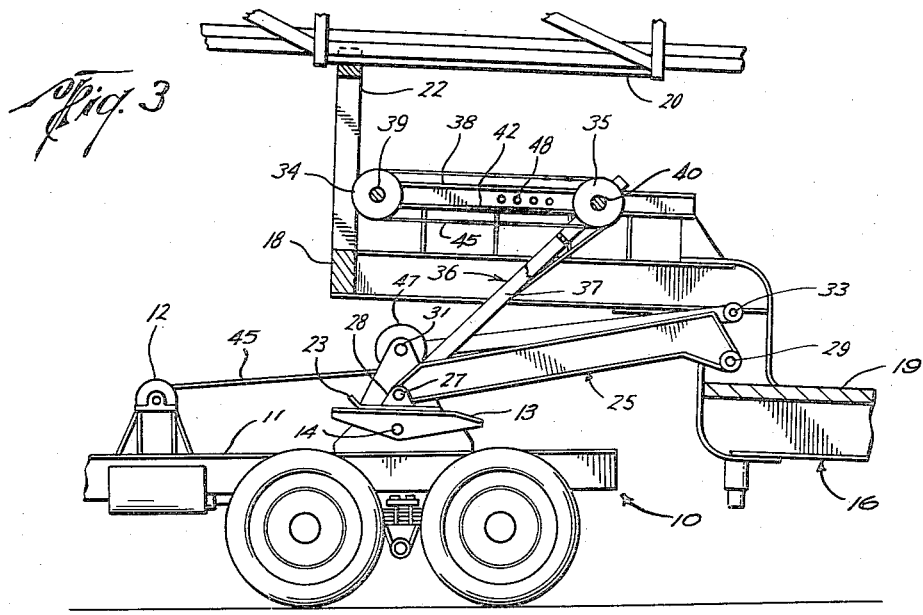
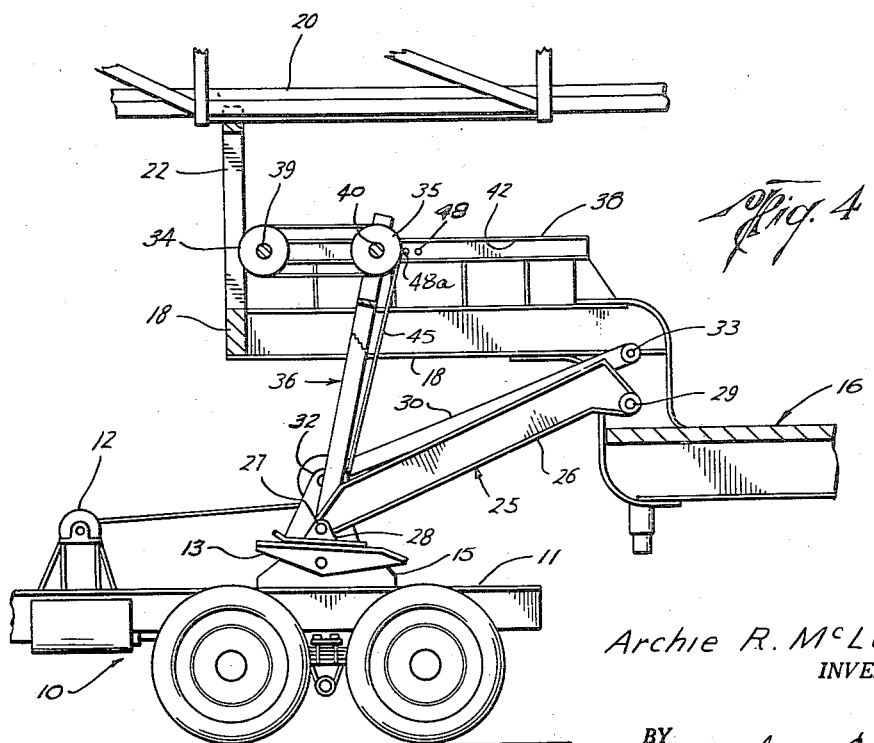

Sept. 30, 1958　　　A. R. McLERRAN　　　2,854,252
TRAILER LIFTING APPARATUS
Filed Aug. 8, 1956　　　　　　　　　　　　　3 Sheets-Sheet 3
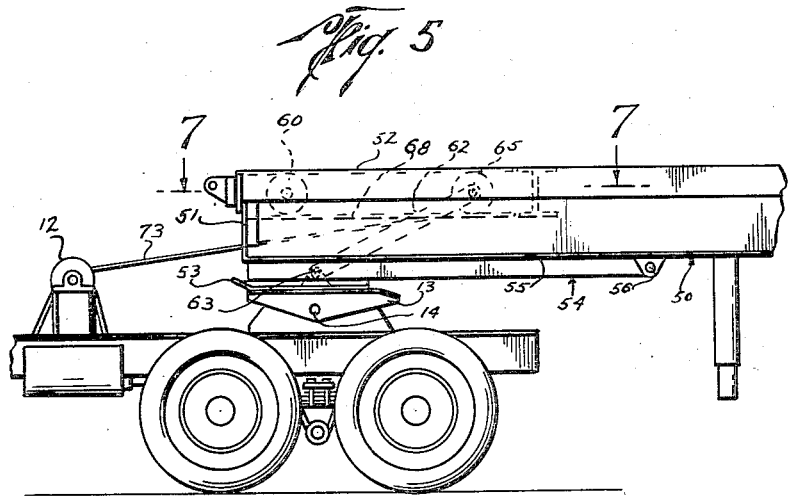
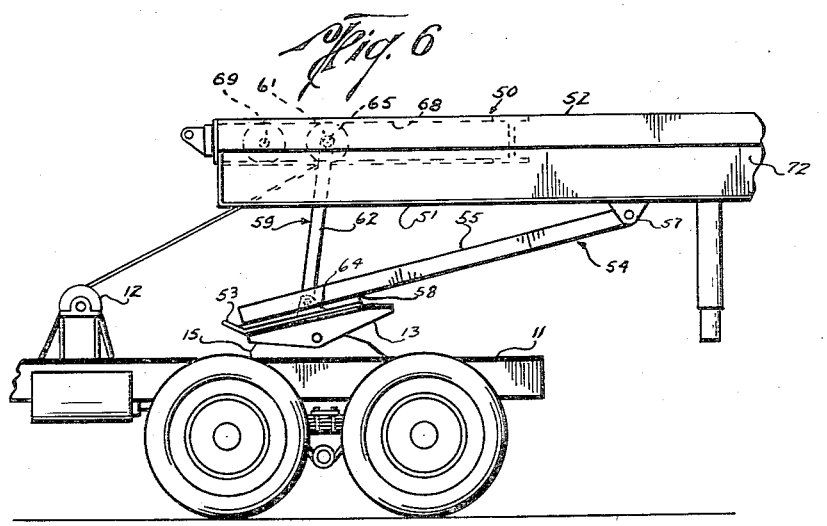
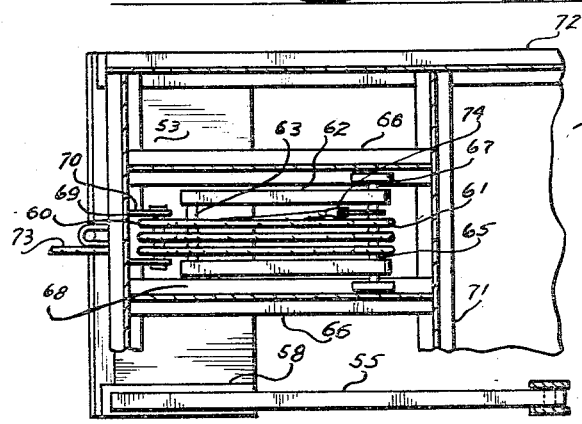
Archie R. McLerran
INVENTOR.
BY
ATTORNEYS

United States Patent Office 2,854,252
Patented Sept. 30, 1958

2,854,252

TRAILER LIFTING APPARATUS

Archie R. McLerran, Beaumont, Tex., assignor to Ideco, Inc., a corporation of Ohio Application August 8, 1956, Serial No. 602,700

15 Claims. (Cl. 280—425)

This invention relates broadly to trailers of the type which are adapted to be hitched to a truck by means of a kingpin on the forward end of the trailer releasably connectable to a fifth wheel on the truck. More particularly, it relates to improved apparatus for leveling such trailers by raising the forward ends thereof above the fifth wheel and the kingpin connected thereto. In one of its aspects, this invention relates to apparatus of this type particularly well-suited for trailers useable in hauling equipment adapted to be mounted above the forward end of the trailer.

One of the more common types of equipment hauled by such trailers are portable well drilling rigs which include, among other items, a mast of considerable length. During conveyance to and from the well location, the mast is disposed in a substantially horizontal position so that it may extend over the forward end of the trailer. At the desired well location, the mast is raised or erected by suitable hoisting apparatus.

It may be necessary to back to the trailer up onto a ramp adjacent the well location or, for that matter, the well location may not be on level ground. In such a case, the forward end of the trailer must be raised to provide a level platform for the equipment. The use of ordinary jacks beneath the forward end of the trailer for leveling same subsequent to disconnection of the truck is undesirable as it is both time consuming and dangerous.

An object of this invention is to provide apparatus for lifting the forward end of a trailer above the connection of its kingpin with the fifth wheel of the towing truck, which apparatus is of simplified construction and provides no obstruction to the disposal of equipment, such as a drilling mast, over the forward end of the trailer.

A more particular object is to provide apparatus of the character described in the foregoing object which may be operated by a hoisting line powered from a winch conventionally provided on trucks of this type.

Another more particular object is to provide apparatus of the character described in the first-listed object having means for locking the forward end of the trailer in a raised position so that the trailer may be maneuvered by the truck while still hitched thereto.

A further object is to provide apparatus for lifting the forward end of a trailer above the connection of its kingpin with the fifth wheel of a truck without causing any substantial movement of the trailer longitudinally with respect to the truck.

A still further object is to provide a trailer having apparatus for lifting its forward end without first disconnecting its kingpin from the fifth wheel of the truck, which apparatus is so constructed as to maintain a secure towing connection between the trailer and truck in any of the lifted positions of the former.

Yet a further object is to provide lifting apparatus of the general character described which is fully integrated with the trailer frame so that with the forward end of the trailer supported in lifted position, the truck may be driven off merely upon disconnection of the kingpin from the fifth wheel and the hoisting line from the winch.

Other objects, advantages and features of this invention will be apparent to one skilled in the art upon a consideration of the written specification, the attached claims and the annexed drawings.

In the drawings, wherein like reference characters are used throughout to designate like parts:

Fig. 3 is a partial view of the truck and trailer of Fig. 1 disposed above substantially level ground, and with the forward end of the trailer in a slightly raised position above the fifth wheel of the truck;

Fig. 4 is another partial view of the truck and trailer, similar to Fig. 3, but with the rearward end of the trailer backed onto a ramp and the forward end thereof lifted further to level the platform, as shown in Fig. 1;

Fig. 5 is a partial elevational view of a trailer hitched to the fifth wheel of a truck by means of another embodiment of the lifting apparatus of the present invention, the trailer being disposed above substantially level ground so that its forward end is in its lowermost position above the fifth wheel;

Fig. 6 is another partial elevational view of the truck and trailer of Fig. 5, but with the forward end of the trailer lifted to a position for leveling the platform of the trailer; and Fig. 7 is a sectional view of the embodiment of the lifting apparatus shown in Figs. 5 and 6, and taken substantially along broken line 7—7 of Fig. 5.

Figure 1:
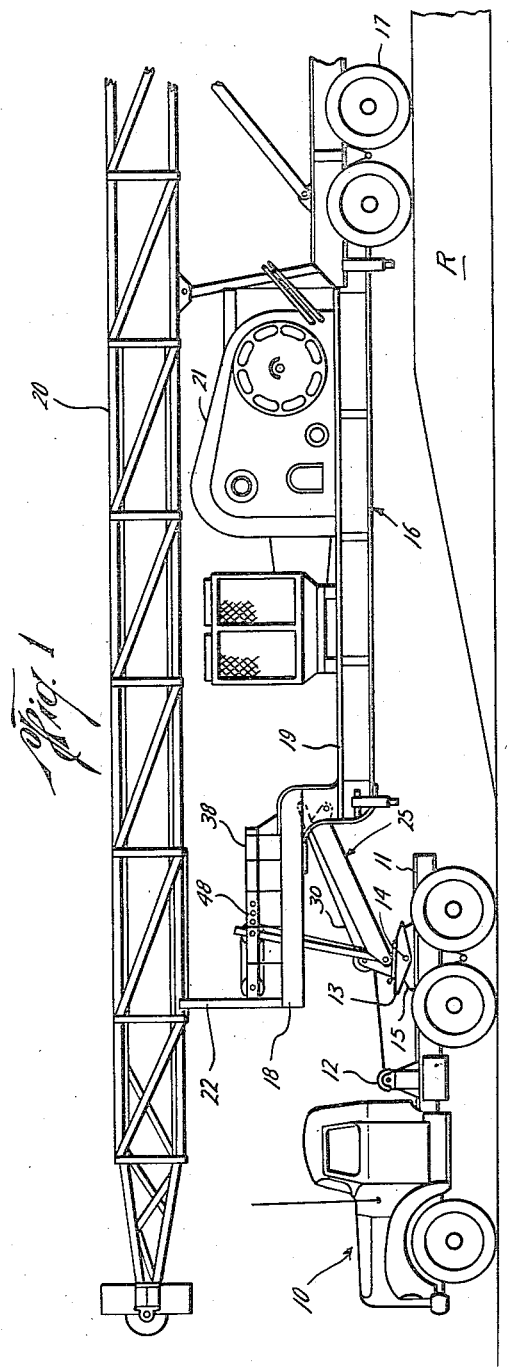
Fig. 1 is an elevational view of a trailer with its rearward end backed onto a ramp and its forward end lifted above the fifth wheel of a truck to which it is hitched by means of one embodiment of the present invention so as to level the platform of the trailer.

Referring now particularly to the above-described drawings, a truck 10 of the type contemplated by the present invention customarily has a winch 12 and a fifth wheel 13 journaled about axes extending transversely to the bed 11 of the truck. As well known in the art, the winch may be rotated by suitable power take-off means on the truck, and the fifth wheel is tiltable within limits about a shaft 14 received through mounting 15. More particularly, and as also well known in the art, the fifth wheel 13 is provided with a flat upper plate having a rearwardly extending key slot therein (not shown) for receiving a kingpin on the forward end of a trailer. Thus, upon latching of the kingpin within the slot of the fifth wheel, the trailer is suitably hitched to the truck.

The embodiment of the present invention which is shown in Figs. 1 to 4 includes a trailer having a frame 16 supported toward its rearward end by wheels 17 (see Fig. 1) and a forward end or gooseneck 18 adapted to be hitched to and lifted above the fifth wheel 13 of the truck in a manner to be described hereinafter. It will be seen that the gooseneck is raised above the platform 19 so that the latter may be disposed at the lowest possible level to provide maximum headroom for the equipment supported thereon which may include, as shown in Fig. 1, a portable drilling rig comprising a mast 20 of considerable length and attendant machinery including a drawworks 21. It is contemplated that the mast 20 may be disposed in a susbtantially horizontal position, as shown in Fig. 1, so that its upper end rests upon a cradle 22 on the forward end of the trailer for disposal above the gooseneck 18 as well as the cab of the truck. As previously mentioned, the mast 20 may be raised to an upright position at a desired well location. However, since the apparatus for so hoisting the mast forms no part of the present invention, it is not described herein.

It should be understood that, although the equipment shown, and especially the lengthy mast 20, is particularly illustrative of the advantages obtained by the novel construction of the lifting apparatus of the present invention, the trailer obviously may be used in mounting and hauling other types of equipment.

The forward end or gooseneck 18 of the trailer frame 16 is hitched to the fifth wheel 13 of the truck by means of a flat plate 23 which is disposed over and complementary to the flat upper plate of fifth wheel 13 and supports a kingpin 24 (Fig. 2) releasably connected within the customary slot (not shown) of the fifth wheel by a suitable latch (not shown). In this manner, it will be understood that the kingpin plate 23 is tiltable with the fifth wheel about the axis of shaft 14.

Figure 2:
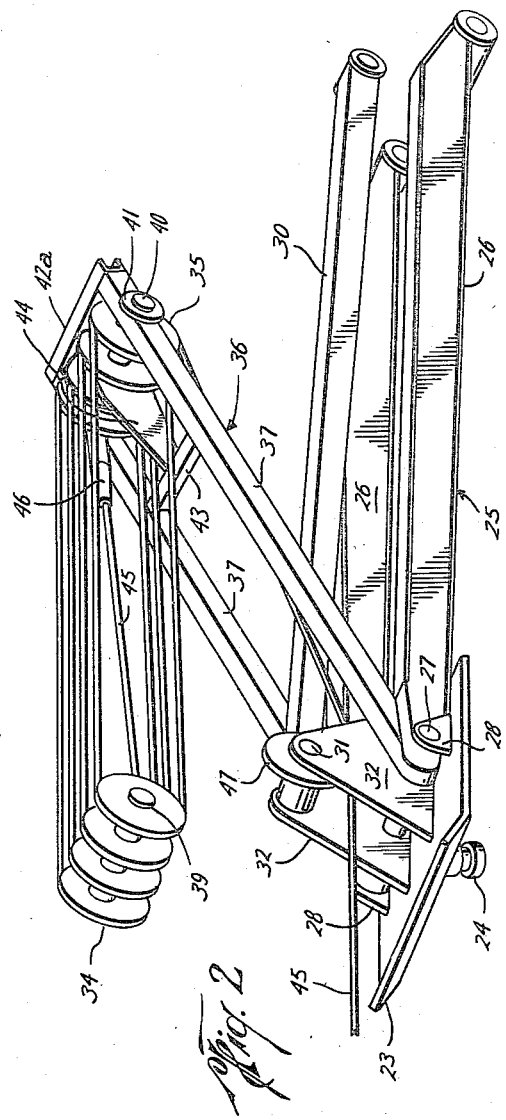
Fig. 2 is an enlarged perspective view of the embodiment of the novel lifting apparatus shown in Fig. 1.

The trailer frame 16 is connected to the kingpin plate 23 by means of linkage 25 which permits the forward end of the trailer to be lifted above the kingpin plate. This linkage includes a pair of links 26 which are laterally spaced apart, as shown in Fig. 2, and which have equal lengths pivotally connected at their opposite ends to the kingpin plate and trailer frame for rotation about axes transversely of the trailer. Thus, the forward end of each link 26 is received about a lateral shaft 27 journaled within brackets 28 on the plate 23, and the rearward end thereof is received about another lateral shaft 29 journaled within a portion of the trailer frame.

The linkage 25 also includes means for maintaining the kingpin plate in fixed tilted position relative to the trailer frame in any given position of the forward end of the frame above the fifth wheel, so that the towing connection of the kingpin and fifth wheel 13 of the truck will remain secure in all positions of the frame. In this first embodiment of the invention, such means comprises a parallelogram linkage connecting the frame to the kingpin plate in a manner to maintain said plate in a fixed attitude with respect to the frame during movement of the forward end of the frame vertically with respect to the fifth wheel.

This parallelogram linkage is formed by an additional link 30 spaced in parallel relation above the links 26 and connected, similarly to the links 26, at opposite ends to the kingpin plate 23 and trailer frame 16. More particularly, and as best shown in Fig. 2, the link 30 is pivotally connected to the plate 23 at its forward end by means of a lateral shaft 31 journaled within brackets 32 on the kingpin plate. The rearward end of the link 30 is pivotally connected to a portion of the frame 16 by means of a lateral shaft 33 journaled in the frame, so that the distance of shaft 33 above shaft 29 is equal to that of shaft 31 above shaft 27 and the distance between shafts 31 and 33 is equal to the distance between shafts 27 and 29.

A first set of pulleys 34 are fixedly supported on the frame 16 with their axes aligned with one another and disposed transversely of the frame. A second set of pulleys 35 is also supported on the trailer frame with their axes aligned with one another and disposed transversely of the frame but, as distinguished from the first set of pulleys 34, are guidably movable along said frame toward and away from said first set. A leg 36, which may be made up of a pair of laterally spaced apart links 37, as shown in Fig. 2, is pivotally connected at its opposite ends to the kingpin plate 23 and the second set of pulleys 35 so that, upon movement of said second set of pulleys toward the first set of pulleys 34, the leg 36 will force the gooseneck 18 upwardly away from the fifth wheel 13. That is, as can be seen from a comparison of Figs. 4 and 3, as the second set of pulleys 35 is moved forwardly toward the first set of pulleys 34, the leg 36 is swung in a counterclockwise direction so as to extend its effective vertical dimension and thereby lift the gooseneck 18 from the position of Fig. 3 to the position of Fig. 4.

The second set of pulleys 35 moves in its guided path substantially horizontally, and more particularly longitudinally, of the trailer frame so that it does not project above the upper end of the gooseneck in any of the lifted positions thereof. In this manner, the novel lifting apparatus of the present invention does not interfere in any way with the disposal of a drilling mast 20 or other equipment above the gooseneck 18. In fact, it is contemplated that the mast 20 may be extended beyond the forward end of the trailer and above the cab of the truck 10. Thus, if the mast is to be conveyed over extremely rough terrain, or if it is to be backed up onto a rather high ramp, the gooseneck 18 may be lifted an amount sufficient to insure that the forward end of the mast will clear the cab of the truck.

It will also be seen that the linkage 25 is so connected to the trailer frame that the movement of the trailer frame longitudinally relative to the truck is negligible as compared to the movement vertically with respect thereto. More particularly, the shafts 29 and 33 are so located on the trailer frame that the links 26 and 30 will be in substantially horizontal alignment with the trailer frame when the forward end of the frame is in its lowered position above the fifth wheel. In still more detail, it will be seen that the shafts 29 and 33 are generally disposed upon the trailer frame 16 rearwardly and beneath the first set of pulleys 34 so that the angle described by the linkage 25 during lifting of the trailer frame will be small in comparison to the angle described by the leg 36.

Each set of pulleys 34 and 35 are supported from spaced apart and longitudinally extending members 38 on the gooseneck 18 of the trailer frame. The first set of pulleys 34 are received about a shaft 39 held at its opposite ends within the longitudinal members 38, while the second set of pulleys 35 are received about a shaft 40 having rollers 41 (see Fig. 2) at its opposite ends guidably movable between tracks 42 (see Figs. 3 and 4) on the inside of each of the longitudinal members 38. Thus, each of the laterally spaced apart links 37 making up the leg 36 are received at opposite ends about the shaft 40 mounting the second set of pulleys 35 and the shaft 27 about which the links 26 of linkage 25 are received. As indicated in Fig. 2, the links 37 may be secured to one another by lateral bracing members 42a and 43, and a longitudinally extending support 44 may be connected between the bracing members to provide a bearing for an intermediate portion of the shaft 40.

As best shown in Fig. 2, the dead end of a flexible line 45 is anchored at 46 to the shaft 40 and then reeved between as many of the alternate pulleys of the first and second set as are required to provide the desired mechanical advantage for lifting the forward end of the trailer by moving the second set of pulleys 35 toward the first set of pulleys 34. The live end of the line 45 is extended from the last of the pulleys for connection with the truck winch 12 so that the line may be taken up or let out as desired. A portion of the line 45 intermediate the winch and the last pulley may be guided by an idler pulley 47 received about shaft 31 pivotally mounting the forward end of link 30.

Referring now to the manner of using the above-described lifting apparatus, it will be understood that generally the trailer will be towed to the desired location with its forward end or gooseneck 18 in a lowered position. In such position, the second set of pulleys 35 will be disposed in their most remote position away from the first set of pulleys 34, and the linkage 25 will be disposed substantially horizontally of the length of the trailer frame 16. Upon arrival at the desired location, however, the trailer may either be disposed over uneven terrain or backed up onto a ramp R (see Fig. 1) which will cause the platform 19 supporting the equipment to be tilted downwardly toward the truck. The platform and trailer are leveled by operation of the winch 12 so as to take up the line 45 which, in turn, swings the lifting leg 36 in a counterclockwise direction so as to raise the forward end of the trailer above the fifth wheel 13. It will be noted, in this respect, that during such raising, the trailer will be moved longitudinally toward the truck only a small amount so that the position of the lower end of the mast 20 (not shown) or other equipment relative to the well location will remain substantially the same.

As previously noted, however, it may be found that the terrain is extremely uneven or that the ramp R is of such height that if the forward end of the trailer is in a lowered position, movement of the wheels 17 thereof upwardly onto the ramp will result in the mast 20 or other equipment being tilted to such an extent as to engage the cab of the truck 10. If such be the case, the gooseneck 18 of the trailer could first be raised to provide clearance between the mast and cab of the truck during conveyance or backing onto the ramp, and then, upon disposal of the trailer in the desired location, such as upon the ramp, the gooseneck may be raised or lowered a desired amount for leveling the trailer and platform 19.

It may also be found that after the gooseneck of the trailer has been raised, it is necessary or at least desirable to relocate the trailer. For this purpose, the lifting apparatus of the present invention is provided with a means for locking the gooseneck in its raised position above the fifth wheel. Such means may comprise a series of openings 48 in each of the longitudinally extending members 38 for receiving a rod 48a (Fig. 4) or the like extending across the space between the members 38 for bearing against the rearward edge of the second set of pulleys 35. Obviously, upon removal of such rod or locking part, the gooseneck 18 may be lowered.

Still further, with the gooseneck 18 of the trailer lifted so as to level the platform 19, suitable supports (not shown) may be placed beneath the forward end of the trailer, and the truck 10 then disconnected from the trailer and driven away. In this respect, it will be noted that the lifting apparatus is fully integrated with the trailer frame such that the trailer may be disconnected from the truck by merely separating the connection of the line 45 with the winch 12 and unlatching the kingpin 24 from the slot in the fifth wheel 13.

Since the embodiment of the lifting apparatus shown in Figs. 5 to 7 corresponds in many respects to the embodiment above-described, the description to follow will be devoted principally to the differences between the two embodiments.

Thus, the trailer frame 50 of the second embodiment may, similarly to that of the first embodiment, be supported toward its rearward end by wheels (not shown) and be hitched at its forward end 51 to the fifth wheel 13 of a truck 10. However, the upper edge of the forward end of the trailer may be disposed on the same level as the platform 52 thereof.

This second embodiment also includes a kingpin plate 53 having a kingpin (not shown) releasably connected to the fifth wheel 13 in the manner previously described, and linkage 54 connecting the frame 50 to the kingpin plate in a manner to permit the frame to be moved vertically relatively to said plate. More particularly, linkage 54 comprises a pair of laterally spaced apart links 55 (see Fig. 7) having one end received about a transverse shaft 56 journaled in a bracket 57 suspended from the trailer frame 50 for pivotal connection to said frame.

However, the kingpin plate 53 is maintained in fixed tilted relation to the frame 50 in any given position of the forward end of the trailer above the fifth wheel of the truck by a means which differs from that described in connection with the first embodiment. More particularly, this means comprises a fixed securement as at 58 of the opposite or forward end of the links 55 to the kingpin plate 53. Thus, since both the kingpin plate and the fifth wheel of the truck swing with the linkage 54, the amount which the forward end 51 of the trailer frame 50 can be raised or lifted above the fifth wheel is limited by the extent to which the fifth wheel may be tilted, as shown, for example, by a comparison of Fig. 6 with Fig. 5.

The lifting leg 59 and the first and second sets of pulleys 60 and 61 differ from their counterparts in the first embodiment in only minor respects. Thus, the lower ends of laterally spaced apart links 62 making up lifting leg 59 are received about a transverse shaft 63 journaled in brackets 64 on the kingpin plate 53, and the upper ends of such links are received about a shaft 65 supporting the second set of pulleys 61 between laterally spaced apart and longitudinally extending members 66 on the forward end 52 of the frame 50. More particularly, rollers 67 (see Fig. 7) on opposite ends of the shaft 65 are guidably movable within tracks 68 on the inner sides of the longitudinal frame members 66 for moving the second set of pulleys toward and away from the first set of pulleys 60, which are carried by a transverse shaft 69 suspended from bracket 70 (see Fig. 7). As best shown in Fig. 7, the bracket 70 as well as each of the longitudinally extending members 66 are supported intermediate the sides 72 of the frame by means of cross members 71 extending therebetween.

As in the case of the first described embodiment, the dead end of a flexible line 73 is connected by an anchor 74 to the lateral shaft 65 of the second set of pulleys 61, and then reeved between the two sets of pulleys in a conventional manner for connection at its live end to the winch 12 on the truck.

The linkage 54 is arranged in such a manner that when the forward end 51 of the frame is in a lowered position above the fifth wheel, the links 55 will be disposed substantially horizontally of the trailer frame. Furthermore, the pivotal connection of the links to the frame 50 at shaft 56 is located generally rearwardly and beneath the location of the first and second set of pulleys 60 and 61 thereon. Thus, as can be seen from a comparison of Fig. 5 with Fig. 6, during lifting of the front end 51 of the trailer, the angle described by the links 55 is small compared to that described by the lifting leg 59. As a result, the trailer frame is moved longitudinally of the truck only a very small amount in comparison to its movement vertically with respect thereto. Although not particularly shown herein, it is obvious that this embodiment may be provided with means similar to that of the first embodiment for maintaining the forward end of the frame in a lifted position above the fifth wheel.

Inasmuch as the above-described apparatus of Figs. 5 and 7 functions similarly to the apparatus of Figs. 1 to 4, such function need not be repeated herein.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In combination with a trailer frame adapted to be towed by a truck having a tiltable fifth wheel, apparatus comprising a kingpin plate releasably connectable with the fifth wheel for tilting therewith, a first pulley fixedly supported on the forward end of the trailer frame, a second pulley supported on the trailer frame for guided movement toward and away from the first pulley, whereby a line connecting the pulleys may be controlled to move the second pulley in one direction, a leg pivotally connected at one end to the second pulley and at its opposite end to the kingpin plate for lifting the forward end of the trailer frame above the fifth wheel and kingpin plate upon movement of the second pulley in said one direction, and linkage connecting the trailer frame and kingpin plate for maintaining the latter in fixed tilted position relative to the trailer frame in any given position of the forward end of the trailer frame above the fifth wheel.

2. Apparatus of the character defined in claim 1, including means on the trailer frame for fixedly locating said second pulley relative to the first pulley for maintaining the forward end of the frame in a lifted position above the fifth wheel.

3. A trailer adapted to be towed by a truck having a tiltable fifth wheel, comprising a frame having wheels toward its rearward end, a kingpin plate releasably connectable with the fifth wheel for tilting therewith, linkage connecting the frame to the kingpin plate for movement vertically relative thereto, a first pulley fixedly supported on the forward end of the frame, a second pulley supported on the frame for movement toward and away from the first pulley, whereby a line connecting the pulleys may be controlled to move the second pulley in one direction and a leg pivotally connected at opposite ends to the kingpin plate and second pulley for lifting the forward end of the frame above the fifth wheel and kingpin plate upon movement of the second pulley in said one direction, said linkage including a link pivotally connected to the frame and so arranged relative to the lifting leg and pulleys as to resist any substantial forward movement of the forward end of the trailer frame relative to the fifth wheel during the lifting thereof.

4. A trailer of the character defined in claim 3, wherein said linkage includes means maintaining the kingpin plate in fixed tilted position relative to the frame in any given position of the forward end of the frame above the fifth wheel.

5. A trailer of the character defined in claim 3, including means on the frame for fixedly locating said second pulley relative to the first pulley for maintaining the forward end of the frame in a lifted position above the fifth wheel.

6. In a truck-trailer combination, wherein the truck is provided with a winch and a tiltable fifth wheel, and the trailer is provided with a kingpin plate releasably connected to the fifth wheel for tilting therewith, apparatus for lifting the forward end of the trailer, comprising a first pulley fixedly supported on the forward end of the trailer, a second pulley supported on the trailer for guided movement substantially horizontally toward and away from the first pulley, means including a leg pivotally connected at one end to the second pulley and pivotally connected at its opposite end in a manner to lift the forward end of the frame above the fifth wheel and kingpin plate upon movement of the second pulley in one direction, a line connecting the winch to the pulleys for moving said second pulley in said one direction upon taking up of said line, and linkage connecting the trailer to the kingpin plate for movement vertically relative thereto, without substantial longitudinal movement relative thereto.

7. Apparatus of the character defined in claim 6, wherein the lifting leg is pivotally connected to the kingpin plate to permit release of the trailer from the truck upon disconnection of said line from the winch and said kingpin plate from said fifth wheel.

8. Apparatus of the character defined in claim 6, including means for maintaining the forward end of the trailer in at least one lifted position.

9. In a truck-trailer combination, wherein the truck is provided with a winch and a tiltable fifth wheel, and the trailer is provided with a kingpin plate releasably connected to the fifth wheel for tilting therewith, apparatus for lifting the forward end of the trailer above the fifth wheel and kingpin plate, comprising a first pulley fixedly supported on the forward end of the trailer, a second pulley supported on the trailer for guided movement substantially horizontally toward and away from the first pulley, means including a leg pivotally connected at one end to the second pulley and pivotally connected at its opposite end in a manner to lift the forward end of the trailer above the fifth wheel and kingpin plate upon movement of the second pulley in one direction, a line connecting the winch to the pulleys for moving said second pulley in said one direction upon taking up of said line, and linkage connecting the trailer frame and kingpin plate for maintaining the latter in fixed tilted position relative to the trailer frame in any given position of the forward end of the trailer frame above the fifth wheel.

10. A trailer adapted to be towed by a truck having a tiltable fifth wheel, comprising a frame having wheels toward its rearward end, a first pulley fixedly supported on the forward end of the frame with its axis disposed transversely thereof, transversely spaced apart tracks on the frame extending longitudinally of the trailer rearwardly of the first pulley, a second pulley having rollers guidably movable over the tracks toward and away from the first pulley, whereby a line connecting the pulleys may be controlled to move the second pulley toward the first pulley, a plate having a kingpin on its lower side releasably connectable to the fifth wheel for rotation therewith, a leg pivotally connected at opposite ends to the kingpin plate and second pulley for lifting the forward end of the frame above the fifth wheel and kingpin plate upon said movement of the second pulley toward said first pulley, and linkage connecting the frame and kingpin plate for maintaining the latter in fixed tilted position relative to the frame in any given position of the forward end of the frame above the fifth wheel, said linkage including a link extending rearwardly from the kingpin plate and pivotally connected to an intermediate portion of the trailer frame rearwardly and beneath said first and second pulleys.

11. A trailer of the character defined in claim 10, wherein both of said first and second pulleys are disposed beneath the upper extremity of the forward end of the frame.

12. A trailer of the character defined in claim 10, wherein said link is fixedly secured to said kingpin plate.

13. A trailer of the character defined in claim 10, wherein said link is pivotally connected to said kingpin plate, and said linkage also includes another link pivotally connected at its opposite ends to the kingpin plate and frame in vertically spaced apart parallel relation with respect to said first-mentioned link, both of said links being of equal length intermediate their pivotal connections.

14. In combination with a trailer frame adapted to be towed by a truck having a tiltable fifth wheel, apparatus comprising a kingpin plate releasably connectable with the fifth wheel for tilting therewith, a first pulley fixedly supported on the forward end of the trailer frame, a second pulley supported on the trailer frame for guided movement toward and away from the first pulley, whereby a line connecting the pulleys may be controlled to move the second pulley in one direction, a leg pivotally connected at one end to the second pulley and at its opposite end to the kingpin plate for lifting the forward end of the trailer frame above the fifth wheel and kingpin plate upon movement of the second pulley in said one direction, and a pair of links pivotally connected as a parallelogram between the kingpin plate and trailer frame for maintaining said plate in fixed tilted position relative to the trailer frame in any given position of the forward end of the trailer frame above the fifth wheel.

15. In combination with a trailer frame adapted to be towed by a truck having a tiltable fifth wheel, apparatus comprising a kingpin plate releasably connectable with the fifth wheel for tilting therewith, a first pulley fixedly supported on the forward end of the trailer frame, a second pulley supported on the trailer frame for guided movement toward and away from the first pulley, whereby a line connecting the pulleys may be controlled to move the second pulley in one direction, a leg pivotally connected at one end of the second pulley and at its opposite end to the kingpin plate for lifting the forward end of the trailer frame above the fifth wheel and kingpin plate upon movement of the second pulley in said one direction, and a link fixedly secured at one end to the kingpin plate and pivotally connected at its opposite end to the trailer frame for maintaining the kingpin plate in fixed tilted position relative to the trailer frame in any given position of the forward end of the trailer frame above the fifth wheel.

References Cited in the file of this patent

UNITED STATES PATENTS

| | | |
|---|---|---|
| 2,347,308 | Woldring | Apr. 25, 1944 |
| 2,689,137 | Iddings et al. | Sept. 14, 1954 |
| 2,760,622 | Magee | Aug. 28, 1956 |